United States Patent

[11] 3,584,546

| [72] | Inventor | Thomas C. Bowman<br>Buffalo, N.Y. |
|---|---|---|
| [21] | Appl. No. | 787,827 |
| [22] | Filed | Dec. 30, 1968 |
| [45] | Patented | June 15, 1971 |
| [73] | Assignee | Acme Highway Products Corporation<br>Buffalo, N.Y. |

[54] SPLICE COVERS FOR PREFORMED SEALS
10 Claims, 7 Drawing Figs.

[52] U.S. Cl. ................................................. 94/18
[51] Int. Cl. ........................................... E01c 11/10
[50] Field of Search ........................... 94/18, 2, 3, 4, 31, 1.5, 15

[56] References Cited
UNITED STATES PATENTS

| 1,966,227 | 7/1934 | Webster | 94/1.5 |
| 2,867,160 | 1/1959 | Wangerow | 94/18 |
| 3,276,336 | 10/1966 | Crone | 94/18 |
| 3,394,640 | 7/1968 | Dreher | 94/18 |

FOREIGN PATENTS

| 961,664 | 6/1964 | Great Britain | 94/18 |

Primary Examiner—Jacob L. Nackenoff
Attorney—Christel and Bean

ABSTRACT: A splice cover comprising a sheathing having a top wall and sidewalls for covering one or more resilient compression seals. The cover can be provided with inturned flanges at the bottom thereof or a bottom wall completely enclosing the peripheral surface of the seals. The splice cover can have various angularly related legs joined together for splicing various shapes of seal joints. An adhesive is used to secure the splice cover onto the seal or seals.

PATENTED JUN 15 1971

INVENTOR.
THOMAS C. BOWMAN
BY Christel + Bean
ATTORNEYS

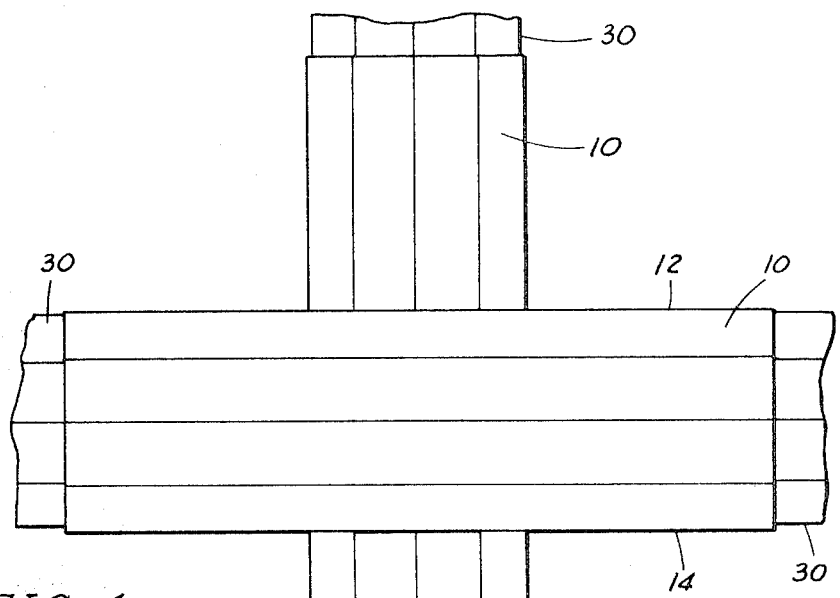
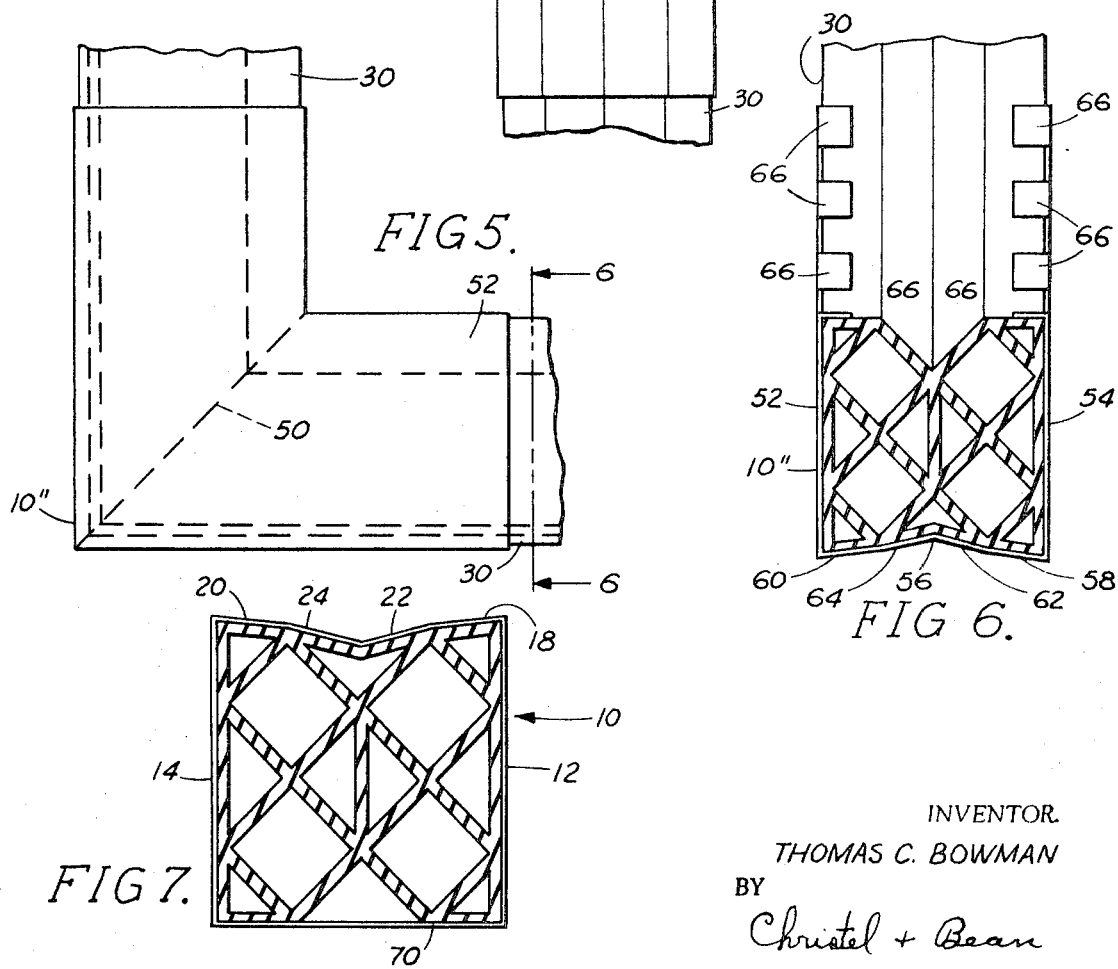

SPLICE COVERS FOR PREFORMED SEALS

BACKGROUND OF THE INVENTION

This invention relates to cover means and, more particularly, to splice covers for joining seals employed in expansion joints.

In the field of highway and bridge construction, it is known to insert elongated seals of elastomeric material into grooves formed between adjacent blocks or slabs of concrete or other building material exposed to variations in temperature causing expansion and contraction of the same and resulting in variations in the width of grooves between such block or slabs. These grooves are normally sealed by hollow, elastomer strips to prevent water and other deleterious materials from passing into the grooves. The seals are subjected to various weather conditions and temperatures and deleterious chemicals existing in polluted atmospheres. Any cracks or fissures developed in the area of the bonded ends and joints of these seal strips are particularly susceptible to the corrosive action of these foreign substances.

SUMMARY OF THE INVENTION

It is, therefore, an object of the present invention to provide a cover for protecting a compression seal against wear and the corrosive action of foreign matter.

It is another object of this invention to provide a splice cover for joining adjacent ends of a composite seal.

It is still another object of the present invention to provide a splice cover for joining seals at their intersections and junctures.

Generally speaking, the splice cover of the present invention is formed of a resilient neoprene material and comprises a pair of sidewalls integrally formed with a top wall for covering an elastic seal. The cross section of the cover is slightly larger than the cross section of the seal to be covered and conforms to the general outer peripheral configuration of the seal. The cover can take various forms for covering various angular and intersecting seal joints. The cover can either partially or completely encase the seal and can be adhesively bonded thereto.

The foregoing and other objects, advantages and characterizing features of the present invention will become clearly apparent from the ensuing detailed description of an illustrative embodiment thereof, taken together with the accompanying drawing wherein like reference numerals denote like parts throughout the various views.

BRIEF DESCRIPTION OF THE DRAWING

FIG. 4 is a fragmentary top plan view similar to FIG. 3 illustrating another form of cross joint connection;

FIG. 5 is a fragmentary top plan view illustrating still another form of splice cover used on an outside corner;

FIG. 6 is a transverse sectional view, taken about on line 6-6 of FIG. 5; and

FIG. 7 is a transverse cross-sectional view of a sealing element illustrating still another form of a splice cover of this invention.

DESCRIPTION OF THE PREFERRED EMBODIMENTS

Figure 1:
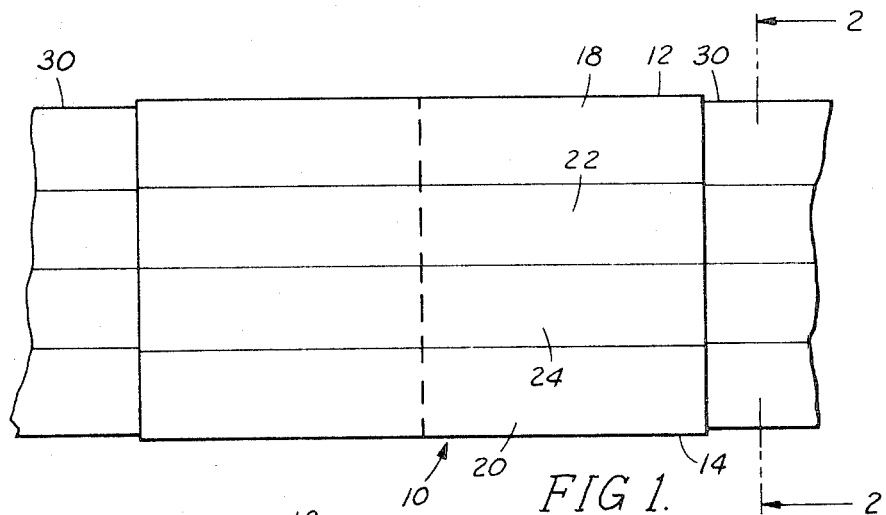
FIG. 1 is a top plan view of the splice cover of the present invention shown covering the adjacent ends of a pair of seals.

Referring to the drawings and particularly FIG. 1, there is shown a cover, generally designated 10, formed of a resilient elastomeric material, such as neoprene for example, which is relatively unaffected by sunlight, ozone, petroleum products, chlorides, deleterious chemicals from industrial smog, maintenance chemicals, and cement alkalis, as well as tensile and compressive stresses of long term duration.

Figure 2:
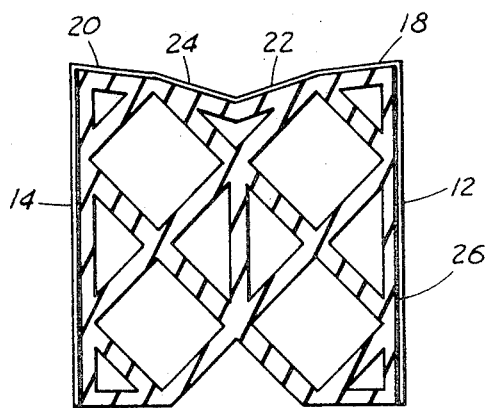
FIG. 2 is a transverse sectional view, taken about on line 2-2 of FIG. 1.

Cover 10 is a one-piece construction comprising a pair of sidewalls 12 and 14 (FIG. 2) joined together by a top wall having downwardly sloping portions 18 and 20 which lead to portions 22 and 24 of increased slope forming a V-shaped recess. Cover 10 is adapted to encase a seal or serve as a splice for joining the abutting ends of a pair of seals 30 as shown in FIG. 1. The cover 10 generally conforms to the peripheral cross section of the seal and is slightly larger in cross section to snugly embrace the same. A suitable adhesive 26 is applied along the inner surface of cover 10 to securely bond cover 10 to the outer surfaces of seals 30. A holding fixture, such as a jig for example, can be employed to hold cover 10 in place during the curing of adhesive 26. It should be understood that cover 10 can extend the full length of a single seal and serve as a sheathing therefor within the purview of the present invention. The abutting ends of seals 30 are adhesively bonded together, the joint being protected by splice cover 10.

By way of example, seal 30 can be of the type composed of a resiliently yieldable material and preferably has a top wall, a bottom wall, and sidewalls forming a tubular structure with an internal truss structure integrally formed therein. The truss structure comprises interconnected cross bars having spaced therebetween which permit the cross bars to collapse into the spaced when the sidewalls are laterally compressed. Such seals are disclosed in U.S. Pat. Nos. 3,179,026 and 3,276,336. Of course, the splice cover of the present invention is in no manner restricted to such a seal but has utility in various seal structures. Preferably, however, the internal configuration of the cover conforms to the external configuration of the seal members.

Figure 3:
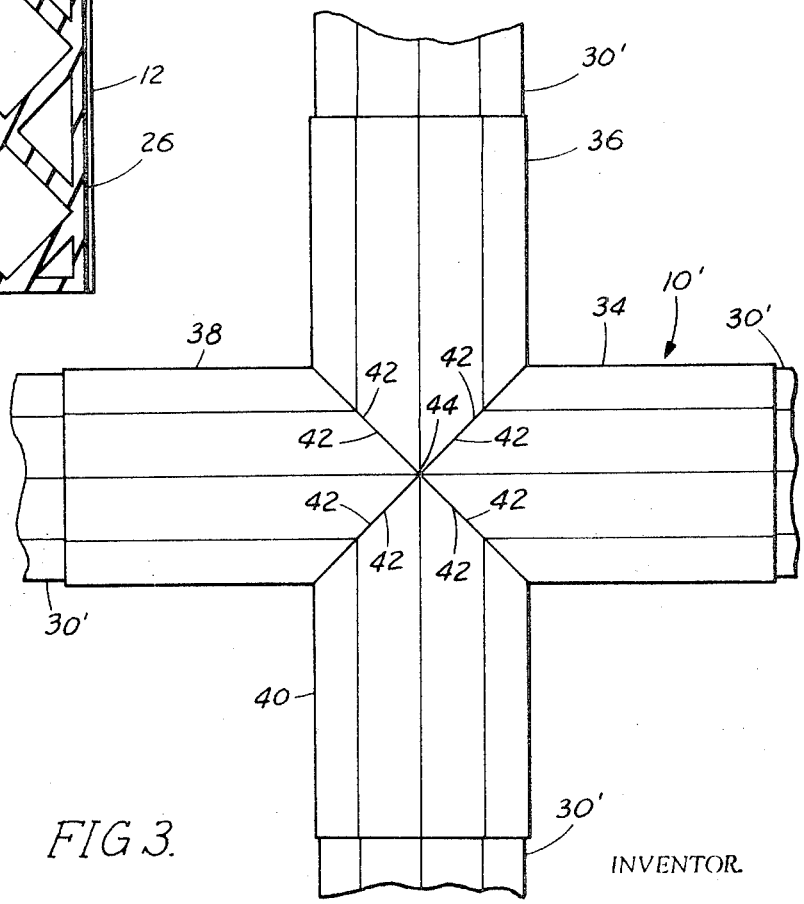
FIG. 3 is a fragmentary top plan view illustrating another form of splice cover used for a cross joint connection.

With reference to FIG. 3, there is shown a "cross joint" cover 10' having four outwardly projecting legs 34, 36, 38 and 40. Each of the connected ends of legs 34, 36, 38 and 40 have inclined surfaces 42 beveled at an angle of 45° relative to the transverse section of the respective leg, the surfaces 42 meeting at a juncture point 44 common with the juncture points of the other three legs. Surfaces 42 of each leg interfit with and abut the beveled surfaces of two adjacent legs. As shown in FIG. 3, cover 10' is used to splice and cover a cross joint consisting of four seals 30' having beveled ends adhesively joined together similarly to splice cover 10'.

FIG. 4 illustrates another form of the invention wherein a pair of elongated seals 30 are joined at their ends to an elongated seal 30 interposed therebetween and extending normal thereto to form a "straight through cross joint". Splice covers 10, similar to the cover of FIG. 1, are provided on the ends of the laterally extending seals and are adhesively joined at their ends to the sidewalls 12 and 14 of a splice cover 10 enclosing a portion of the seal 30 disposed between said laterally extending seals.

It should be understood that splice covers of plan configurations other than those illustrated in FIGS. 3 and 4 can be utilized to join corners or intersections of seals, such configurations including an L-shape, or a T-shape, or intersecting cross joints in which the legs meet at angles other than 90°.

FIG. 5 illustrates an angularly shaped splice cover 10" used to enclose the juncture of a pair of seals 30 having ends beveled at an angle of 45° which meet as at 50 to form an outside corner. Splice cover 10" is formed in one piece to provide spaced sidewalls 52 and 54 and an intermediate wall 56 connecting said spaced walls. As shown in FIg. 6, intermediate wall 56 comprises a pair of inwardly inclined portions 58 and 60 which terminate in further inclined portions 62 and 64 forming a V-shaped recess. Cover 10" differs from those previously described in that a plurality of longitudinally spaced tabs 66 extend inwardly from the spaced walls 52 and 54 at right angles thereto to partially embrace the inner sides of seals 30. An elongated continuous flange extending lengthwise of the seal can be employed in lieu of spaced tabs within the purview of the present invention. Also, the seal can be oriented in use in any angular orientation desired.

FIG. 7 illustrates still another form of a splice cover of this invention wherein cover 10 is provided with a bottom wall 70 formed integral with sidewalls 12 and 14 to completely sheath or enclose the seal. Although an adhesive bond between the cover and the seal is preferable in all the forms herein described, it can be eliminated in the form of the invention depicted in FIG. 7 and even in the form of FIG. 6 if desired.

From the foregoing it is seen that the present invention fully accomplishes its intended objects and provides a novel and simple cover for compression seals to protect the same against adverse weather and temperature conditions and deleterious chemicals. Furthermore, the cover functions as a splice in joining the ends and intersecting portions of a plurality of seals, and protects such joints against the admission of deleterious materials. Illustrative embodiments of this invention having been disclosed, it is to be understood that numerous modifications thereof can be made without departing from the spirit and scope of this invention as defined in the appended claims.

I claim:

1. A seal assembly comprising at least a pair of seals each having a body with a top wall, a bottom wall and sidewalls, said seals having portions disposed in a contiguous relation, splice means formed of resilient elastic material partially covering said contiguous portions of said seals for joining the latter, said splice means being of a generally inverted U-shaped configuration in cross section having a top wall and a pair of spaced sidewalls formed integral with said top wall for slip fitted engagement over the top of the contiguous portions of said seals, said top and sidewalls of said splice means having continuous and uninterrupted inner surface overlying said contiguous portions of aid seals, and means for adhesively securing said splice means to said seals.

2. A seal assembly according to claim 1 wherein said sidewalls of said splice means have tabs at the lower ends thereof extending inwardly therefrom toward each other, said tabs being spaced lengthwise of said walls.

3. A seal assembly according to claim 1 wherein said sidewalls of said splice means have inturned flanges remote from said top wall extending toward each other in a direction substantially normal to said sidewalls.

4. A seal assembly according to claim 1 wherein said splice means is of a unitary, one-piece construction and covers the joint between said contiguous portions of said seal to form an integral assembly.

5. A seal assembly according to claim 4 wherein said contiguous portions of said seals are disposed in an axially aligned, end-to-end relation.

6. A seal assembly according to claim 4 wherein said splice means comprises a plurality of angularly related legs, each leg having an end surface formed integral with the end surface of at least one other leg.

7. A seal assembly according to claim 6 wherein said legs meet to form a T-shaped joint.

8. A seal assembly according to claim 6 wherein said legs meet at right angles to form an intersecting cross joint.

9. A seal assembly according to claim 6 wherein said legs meet at right angles to form an intersecting cross joint.

10. A seal assembly according to claim 1 wherein said top, bottom and sidewalls of said seals define tubular structures having internal truss structures formed integral therewith, respectively; said top walls and said sidewalls have outer surfaces, respectively; said outer surfaces of said top walls, respectively, having inwardly sloping portions; said top and sidewalls of said splice means having inner surfaces conforming to and being contiguous with the outer surfaces of said top and sidewalls of said seals, respectively whereby said splice means covers portions of said seals.